May 19, 1970  N. J. HAYES  3,512,289
ANIMAL IDENTIFICATION TAG AND INSTALLATION TOOL THEREFOR
Filed May 27, 1968  2 Sheets-Sheet 1
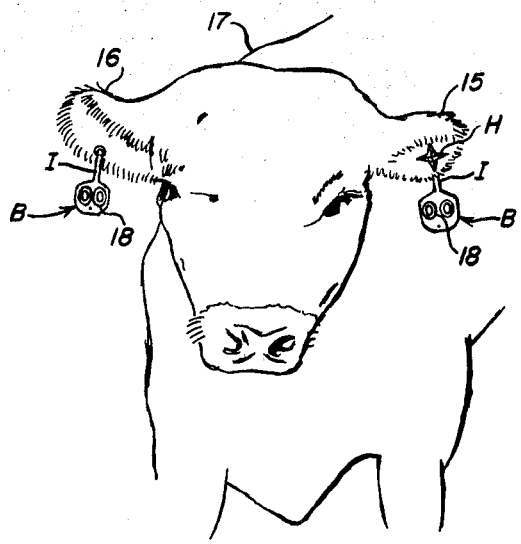
Fig. 1
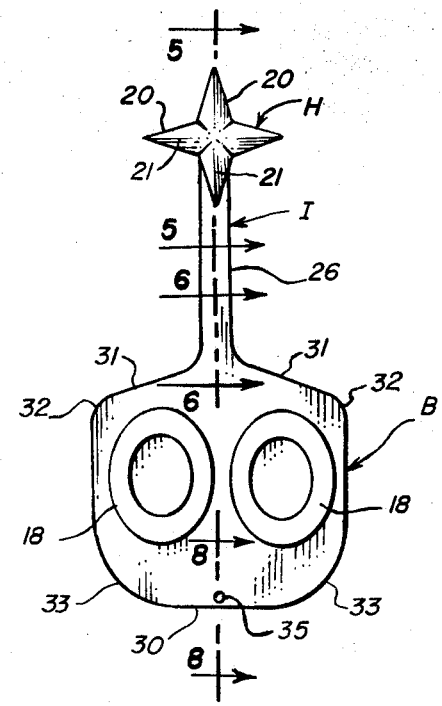
Fig. 2
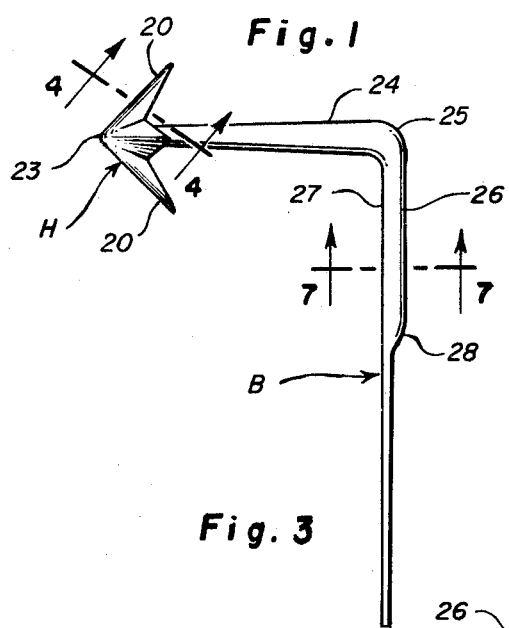
Fig. 3
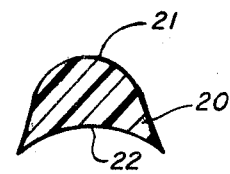
Fig. 4
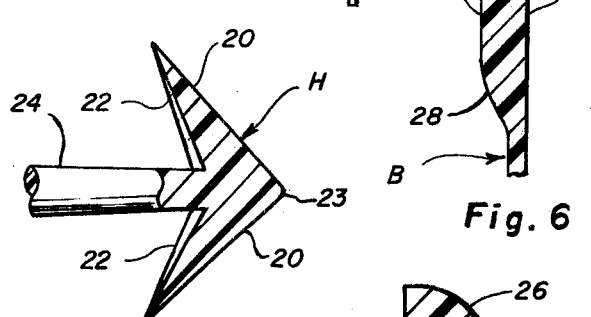
Fig. 5
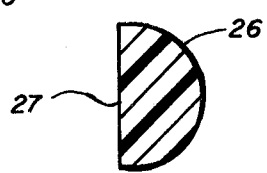
Fig. 6
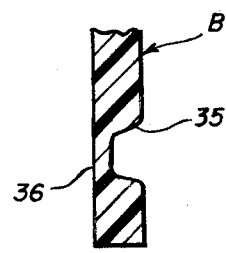
Fig. 8
Fig. 7
INVENTOR.
Norman J. Hayes
BY
Van Valkenburgh & Lowe
ATTORNEYS May 19, 1970   N. J. HAYES   3,512,289
ANIMAL IDENTIFICATION TAG AND INSTALLATION TOOL THEREFOR
Filed May 27, 1968   2 Sheets-Sheet 2

INVENTOR.
Norman J. Hayes
BY
Van Valkenburgh & Lowe
ATTORNEYS

United States Patent Office 3,512,289
Patented May 19, 1970

3,512,289
ANIMAL IDENTIFICATION TAG AND
INSTALLATION TOOL THEREFOR
Norman J. Hayes, Cody, Wyo., assignor to Y-Tex Corporation, San Antonio, Tex., a corporation of Texas
Filed May 27, 1968, Ser. No. 732,320
Int. Cl. G09f 3/00
U.S. Cl. 40—301                           15 Claims

ABSTRACT OF THE DISCLOSURE

An animal identification tag having a head provided with four rearwardly slanting, flexible prongs which are convex and concave, respectively, on the front and rear and extend to a blunt point at the front, with a tang increasing in diameter from the head to a corner having a circular cross section and a neck depending from the corner, with a flat body suspended by the neck and having a surface to receive identification marks. A tool for installing the tag includes an oval or rounded piercing blade having a sharpened front point and cutting edges, with a top slot for receiving a top prong of the head, a pair of side notches having a convex rear edge to fit against the concave rear surface of a pair of side prongs, and a bottom slot, though which a lower prong extends, serves as a loading space for the tag. The edges of the bottom slot are spaced apart to grip the neck of the tag, while the tang and corner are inside the tube. For one step installation, the blade is merely pushed through a desired point in an ear or the like and then quickly withdrawn, leaving the head of the tag on the opposite side of the ear, since the prongs will be folded inwardly while passing through the ear, but will snap outwardly against the ear upon withdrawal of the tool.

---

This invention relates to animal identification tags, utilized to identify animals, such as cattle, and also utilized in identifying other animals, through attachment to an ear or the like of the animal.

The animal identification tags of my prior U.S. Pats. Nos. 3,260,007 and 3,357,122 have each been sold extensively, but each requires two parts, which adds to the cost. The animal tag of my Pat. No. 3,260,007 also requires a relatively expensive tool to force the relatively hard pointed pin through the ear of an animal, which pin is forced into a socket at the upper end of the neck of the tag, but this pointed pin is not as effective in producing an aperture in the animal's ear as a pointed, sharpened tool which not only penetrates but also cuts laterally. The two-component animal tag of my U.S. Pat. No. 3,357,122 requires a slit to be produced in the animal's ear prior to insertion of a connector through the hole and slipping the connector around in the hole, followed by attachment of the tag to the connector. Of course, any two-component animal tag must be constructed so that there is little possibility of the tag being dislodged from the connector, due to engagement with a tree limb, fence wire, brush or the like. The two-component animal tag of my Pat. No. 3,357,122 accomplishes this to a high degree, but, at the same time, requires a relatively complicated construction which is costly to produce, which requires more time for installation than many persons believe should be required, and the pin of which does give on encountering a fence wire, brush or the like, thus producing the possibility of the pin breaking or tearing the animal's ear.

Among the objects of this invention are to provide a novel animal identification tag; to provide such a tag which is readily attached to an ear or the like of an animal; to provide such a tag which is securely attached to the animal in a manner which will reduce any tendency for either damage to the animal's ear or the tag being pulled out of the ear by encountering a tree limb, fence wire, brush or the like; to provide such a tag which may be formed as a single part, thus reducing the cost of molds and the expense of production; to provide such a tag which may be attached by an extremely simple operation, such as a single step; to provide such a tag which is strong and durable, yet sufficiently flexible that it can be bent or twisted; to provide a novel tool for installing the tag of this invention; to provide such a tool which is simple in construction and requires merely a single forward and rearward movement for installation of the tag; to provide such a tool and such a tag, in combination, which will result in the tag being completely installed upon insertion and withdrawal of the tool; to provide such a tool and tag, in combination, which will permit the tissue to grow back to conform to the portion of the tag in the ear or the like; to provide such a tool which is provided with a point and sharp cutting edges, for producing an aperture in the ear of an animal sufficient in size to accommodate the portion of the tag remaining therein, after installation, without the removal of animal tissue; to provide such a tool which twill hold the tag securely in position for installation, but will readily release the tag upon withdrawal of the tool; and to provide such a tag and such a tool, as well as a combination of such a tag and tool, which are effective and efficient in use and operation.

The foregoing and additional objects of this invention will become apparent from the description which follows, taken in conjunction with the accompanying drawings, in which:

FIG. 1 is a perspective view, on a reduced scale, of an animal tag constructed in accordance with this invention, attached to an ear of a steer or calf;

FIG. 2 is a front elevation of an animal tag of this invention;

FIG. 3 is a side elevation thereof;

FIG. 4 is an oblique section, on an enlarged scale, taken along line 4—4 of FIG. 3, through one prong of a head of the tag;

FIG. 5 is a fragmentary section, on an enlarged scale, taken along line 5—5 of FIG. 2, longitudinally through the head of the tag;

FIG. 6 is a fragmentary longitudinal section, on an enlarged scale, taken along line 6—6 of FIG. 2, longitudinally of a portion of a neck and body of the tag;

FIG. 7 is a transverse section, on an enlarged scale, taken along line 7—7 of FIG. 3, through the neck of the tag;

FIG. 8 is a fragmentary vertical section, on an enlarged scale, taken along line 8—8 of FIG. 2, adjacent the lower end of the tag body;

Figure 9:
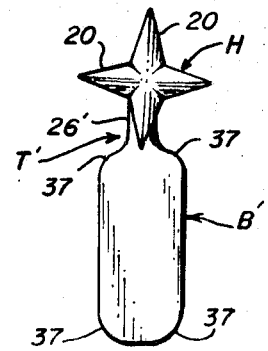
FIG. 9 is a front elevation, similar to FIG. 2, of an alternative form of tag constructed in accordance with this invention.

An identification cattale tag I of this invention may be fixed, as in FIG. 1, to either ear 15 or 16 of an animal 17, such as a steer, to enable the animal to be identified from a distance, as by a number or numbers 18, or other identifying mark, painted, embossed or otherwise placed on a body B of the tag. Ordinarily, a tag will be placed in only one ear of the animal, but a tag in each ear is shown in FIG. 1, to illustrate the fact that a head H of the tag may be positioned on either the front of the ear, as in the case of the tag fixed to ear 15, or on the back side of the ear, as in the case of the tag fixed to ear 16. The tag I is conveniently molded from a suitable plastic, such as opaque urethane, which is relatively resilient but sufficiently tough to withstand the rigors of hard usage.

The head H of the tag, as in FIGS. 2 and 3, is star shaped, including a series of flexible prongs 20, such as four in number and slanting rearwardly, preferably having a convex or rounded outer surface 21 and a concave inner surface 22, as in FIGS. 4 and 5. Prongs 20 merge at the front to form a preferably blunt point 23 which, along with the convex outer surfaces 21, decrease the possibility of the tag head catching on a fence wire, tree limb or in brush or other object, and damaging the animal's ear or pulling out of the ear.

Head H is disposed at the front end of and integral with a tank 24 which may be circular in cross section but may taper or enlarge in diameter, rearwardly from the head to a right angle corner 25, which may also be circular in cross section and connect tang 24 with a neck 26, from which body B depends. The taper of tank 24 assists in maintaining the inside of prongs 20 against the ear, irrespective of whether head H is on the front or rear of the ear, while the surface of tang 24 and corner 25 decrease the possibility of the tag catching, at a point near the ear, on a fence wire, tree limb, brush or the like. Neck 26, as in FIG. 7, may be semi-circular in cross section, or circular, oval or other configurations, if desired, such as having a flat side 27 facing toward head H, as in FIG. 3, and coplanar with the face of body B directly beneath. Since body B is preferably thinner than the tank or neck, neck 26 merges therewith on one side, as shown, or on both sides, if desired, in a preferably smoothly curved merging portion 28, as in FIGS. 3 and 6.

Body B, as in FIGS. 2 and 3, is preferably sufficiently thin to be relatively flexible, and may be generally rectangular as shown, or circular, oval or other shape, if desired. Generally rectangular body B may have a flat bottom 30, a sloping shoulder 31 on each side at the top, as well as rounded top corners 32 and rounded bottom corners 33, again to decrease the possibility of catching on a fence wire, tree limb, or the like. To facilitate the placement of a colored button to provide additional marking, such as to distinguish animals born in one year from those born in another, at the bottom of the tag a well 35, on one side of the tag, as in FIG. 8, produces a thin web 36. When affixing such a button or marker, as by riveting through the tag, a hole may be provided by punching out the thin web 36.

The alternative tag I' of FIG. 9 is particularly adapted for use on smaller animals, such as calves, sheep and the like. Tag I' is provided with a head H similar to the head H of the first embodiment, as well as a similar but shorter tang connected to a similar but shorter neck 26', from which a body B' depends. Body B' is generally rectangular, with the longer sides upright, but has rounded corners 37 to decrease the possibility of the tag catching on a fence wire, tree limb, brush or the like.

Figure 10:
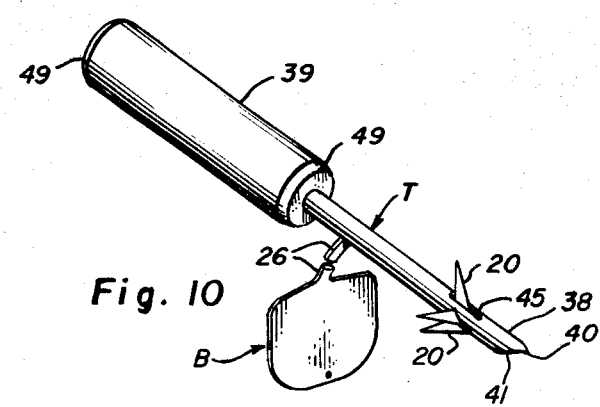
FIG. 10 is a perspective view, on a reduced scale, of a tag of this invention placed in an installation tool of this invention, prior to installation of the tag.
Figure 11:
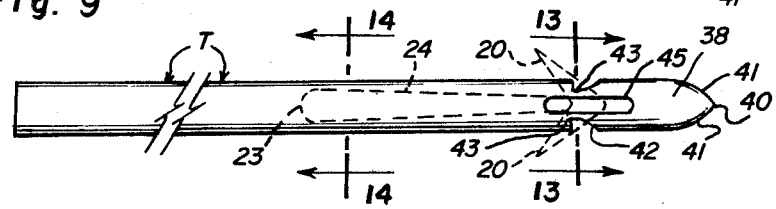
FIG. 11 is a condensed top plan view of a piercing and installation blade forming a part of the tool of FIG. 10, with the position of certain parts of the tag, particularly the prongs of the tag head, being shown in doted lines.
Figure 12:
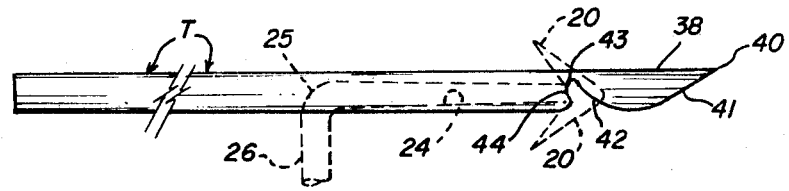
FIG. 12 is a condensed side elevation of the piercing and installation blade of FIG. 11, with certain portions of the tag again being shown in doted lines.

Either of tags I or I' may be installed in an ear of the animal in any suitable manner, as by the tool shown in FIG. 10, which includes a tube T having an oval or rounded piercing blade 38, and a handle 39 for the tool, which may be separate, as shown, or may be integral with the tube. The blade 38 of tube T is jabbed or pushed sharply through the ear of the animal, at the selected position for the head of the tag, to carry prongs 20 of head H with it, with the prongs folding back toward the tube as the front end of the blade passes through the ear, whereupon the blade 38 is quickly withdrawn but resilient prongs 20 have, upon emerging on the opposite side of the ear, flared out, so that head H will remain on the opposite side of the ear as the blade is withdrawn. The movement of the piercing blade through the ear and back can be made in less than a second, to minimize the reaction of the animal to installation of the tag. The blade 38, as in FIGS. 11 and 12, is provided with a sharp piercing point 40, from which sharpened cutting edges 41 diverge to each side and extend to the respective front edge 42 of a side notch 43 having a rear edge 44. Each rear edge 44 of a side notch is adapted to fit against the concave rear surface of a prong 20, to push the prongs of head H through the aperture in the ear formed by piercing point 40 and cutting edges 41, while each front edge 42 of a side notch is sloped, as in the manner shown, to permit the blade to pass rearwardly more readily over the side prongs 20 upon withdrawal. The upper prong 20, as in FIG. 10, extends through a longitudinal slot 45 in the top of blade 38, which may extend slightly rearwardly from the top prong and preferably a greater distance forwardly from the top prong, so that the top prong, which is the only one of the four prongs which has a tendency to be folded back down upon withdrawal of the tube, will not be folded back down until the side prongs and bottom prong have sprung outwardly to engage the ear. As will be evident, the blade tends to ride up and over the top prong 20 upon withdrawal, so that the top prong is usually not folded back down to the same extent as when passing forwardly through the ear.

Figure 13:
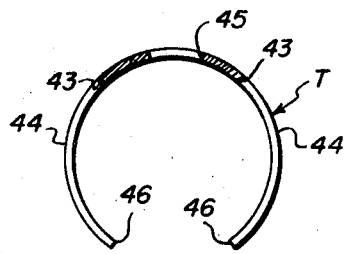
FIG. 13 is a transverse section, on an enlarged scale and taken along line 13—13 of FIG. 11, showing particularly slots in the piercing blade through which portions of the tag head extend, for installation purposes.
Figure 14:
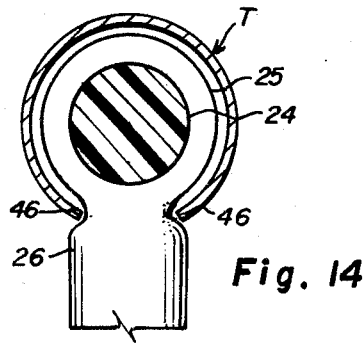
FIG. 14 is a transverse section, on an enlarged scale and taken along line 14—14 of FIG. 11, but also showing a portion of the tag itself at the same section.

Rearwardly of the side notches 43, blade 38 is provided with a longitudinal slot on the underside having edges 46, as in FIG. 13, which are spaced apart sufficiently to clear the lower prong 20 but close enough that corner 25 may be snapped into the tube, as in FIG. 14, and edges 45 will squeeze against neck 26 to hold the tag in position in the tube. It will be noted that the compression effect of edges 46 on neck 26, just below corner 25, is exaggerated in FIG. 14 for purposes of illustration. Preferably, the squeezing or compression effect of slot edges 46 on neck 26 is sufficient to permit the tool and tag to be handled and positioned for attachment of the tag to the animal's ear, but insufficient to interfere with withdrawal of the tube and leave head H on the opposite side of the ear.

Figure 15:
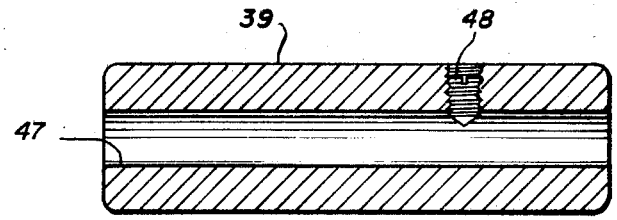
FIG. 15 is a longitudinal section, on an enlarged scale, of a handle of the tool of FIG. 10.

Handle 39 of the tool of FIG. 10 may, as in FIG. 15, comprise a cylindrical block of metal having a bore 47 into which tube T may be inserted and a set screw 48, or other suitable device, for locking tube T to the handle. The corners of the handle may be rounded, as in FIG. 15, or provided with a bevel 49, as in FIG. 10. As indicated previously, handle 39 and tube T may be formed integrally, in which event blade 38 may merely extend forwardly from the handle. Also, handle 39 may have a shape other than cylindrical, such as having scallops or depressions to provide finger grips.

Although a tag of this invention is usually attached to an ear of an animal, it may be attached to the brisket, may be attached to the flank, or may be attached to the skin at the Achilles tendon. When attaching a tag to the flank or brisket, the skin is preferably pulled away from the muscle, leaving two layers of skin, through which a round hole may be made, as by a conventional punch, prior to insertion of tube T. Such a round hole is preferably first produced to prevent infection on the inside of the two layers of skin, since the removal of tissue, as by a round hole, tends to produce healing from the inside out, whereas a slit through two such layers of skin may heal first on the outside and produce an abscess.

Although different embodiments of this invention have been illustrated and described, it will be understood that other embodiments may exist and that various changes and variations may be made, all without departing from the spirit and scope of this invention.

What is claimed is:

1. In the combination of an animal identification tag and a tool for installing the same:
said tag including a head having a series of laterally extending, flexible prongs, a body provided with a surface on which an indicating mark may be placed, and means connecting said head with said body, a portion of said connecting means being adapted to extend through an aperture in an ear or the like of said animal; and
said tool including a tube having a front means constructed and arranged to produce said aperture, means for receiving said prongs with said prongs extending from the inside to the outside of said tube, and means for engaging the rear side of at least two of said prongs, whereby said flexible prongs will be folded back toward said tube when said piercing tube is moved through said ear or the like from one side thereof but will snap outwardly to engage the opposite side of said ear or the like and prevent withdrawal of said prongs when said tube is withdrawn from said one side of said ear.

2. In the combination of claim 1, wherein:
said connecting means includes a tang extending rearwardly from said head; and
said body is disposed below said tang.

3. In the combination of claim 2 wherein:
said prongs are laterally concave on the rear side and slant rearwardly.

4. In the combination of claim 2, wherein:
said prongs are laterally convex on the front side and merge into a blunt point at the front of said head.

5. In the combination of claim 2, wherein:
said tang is laterally round and diminishes in cross section toward said head.

6. In the combination of claim 2, wherein:
said tang and a neck connected to said body are disposed at approximately a right angle; and
said tang and neck are connected by a corner having a generally circular cross section.

7. In the combination of claim 2, wherein:
said body is flat on its opposite sides and is provided with a well in one side, leaving a web at the opposite side.

8. In the combination of claim 1, wherein:
said tool is provided with a top slot through which one said prong extends for installation, a pair of side notches through which a pair of said prongs respectively extend for installation, and a bottom, longitudinal slot through which a lower prong extends for installation.

9. In the combination of claim 1, wherein:
said tag has a head provided with four prongs spaced equally apart; and
said tool includes a piercing blade having:
a longitudinal slot spaced from said front point and through which an upper prong of said head may extend;
a pair of notches on opposite sides of said slot, the rear edge of each notch being constructed and arranged to engage the rear of a side prong of said head; and
a longitudinal slot at the bottom through which a lower prong of said head may extend.

10. In the combination of claim 9, wherein:
said blade receives said tang of said tag, said tag having a neck connected to said body; and
said bottom longitudinal slot is proportioned to grip said neck of said tag, said tag having a corner connecting said tang and neck and said corner having a size to snap into said blade through said bottom slot with said top prong in said top slot and said side prongs in said side notches.

11. In the combination of claim 1, wherein:
said head is provided with a top prong, a bottom prong and at least one side prong and said connecting means includes a neck connected to said body; and
said tool includes a piercing blade having:
front cutting means constructed and arranged to produce an aperture in an ear or the like of said animal;
a longitudinal, restricted top slot through which a top prong of said tag head may extend;
a bottom longitudinal slot through which a bottom prong of said head may extend;
at least one side notch having a rear edge constructed and arranged to engage the rear edge of a corresponding prong of said head; and
said longitudinal slot is adapted to extend past said neck and the edges of said bottom slot are spaced apart a distance to grip said neck, whereby said tag may be placed in said tube with said prongs extending through the respective slots and notch, with said tang and corner within said tube and with said edges of said bottom slot gripping said neck.

12. An animal identification tag comprising:
a head having a series of four laterally extending, substantially equally spaced, flexible prongs, each of which taper laterally and diminish in width outwardly and the rear sides of which are laterally concave, said prongs being laterally convex on the front side and merging into a blunt point at the front of said head;
a tang extending rearwardly from said head and adapted to extend through an aperture in said ear or the like to the opposite side thereof, said tang being laterally round and diminishing in cross section toward said head;
a body below said tang and provided with a surface on which an indicating mark may be placed;
a neck connected to said body and disposed at approximately a right angle to said tang, said neck being semicircular in lateral section and a flat side thereof being coplanar with a side of said body; and
a corner having a generally circular cross section connecting said tang and said neck.

13. An animal identification tag as defined in claim 12, wherein:
said body is flat on its opposite sides and provided adjacent its lower edge with a well in one side, leaving a web at the opposite side.

14. In the combination of an animal identification tag and a tool for installing the same:
said tag including a head having a series of laterally extending, flexible prongs, a body provided with a surface on which an indicating mark may be placed, and means connecting said head with said body, a portion of said connecting means being adapted to extend through an aperture in an ear or the like of said animal; and
said tool having front means constructed and arranged to produce said aperture and means for engaging the rear side of at least two of said prongs, whereby said tag may be installed by forcing said tool partially through an ear or the like of an animal from one side and withdrawing said tool from the same side, with said prongs engaging the opposite side of said ear.

15. In the combination of an animal identification tag and a tool for installing the same:

said tag having means for engaging the far side of an ear or the like of said animal, a body provided with a surface on which an indicating mark may be placed, and means connecting said engaging means with said body, a portion of said connecting means being adapted to extend through an aperture in said ear or the like, with said body on the near side and said engaging means on the far side of said ear; and said tool having front means constructed and arranged to produce said aperture and notch means for engaging the rear side of a portion of said tag, whereby said tag may be installed by forcing said tool from said near side partially through said ear to produce said aperture and force said engaging means through said ear along with said tag, and withdrawing said tool from the same side through disengagement of said notch means with said portion of said tag.

References Cited

UNITED STATES PATENTS

| | | | |
|---|---|---|---|
| 460,138 | 9/1891 | Hornberger | 128—330 |
| 3,334,433 | 8/1967 | Gospodnetich | 40—301 |
| 3,334,434 | 8/1967 | Melin | 40—301 |
| 3,399,478 | 9/1968 | Tarver | 40—300 |

FOREIGN PATENTS

| | | |
|---|---|---|
| 267,682 | 6/1966 | Australia. |
| 1,039,602 | 8/1966 | Great Britain. |

WILLIAM H. GRIEB, Primary Examiner

U.S. Cl. X.R.

128—330